(12) United States Patent
Jiang et al.

(10) Patent No.: US 11,191,082 B2
(45) Date of Patent: Nov. 30, 2021

(54) SYSTEMS AND METHODS FOR RATE SELECTION AND RESOURCE UNIT ALLOCATION WITHIN A WIRELESS LOCAL AREA NETWORK (WLAN)

(71) Applicant: Marvell World Trade Ltd., St. Michael (BB)

(72) Inventors: Jinjing Jiang, San Jose, CA (US); Yan Zhang, Palo Alto, CA (US); Bo Yu, San Jose, CA (US); Xiayu Zheng, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 162 days.

(21) Appl. No.: 16/547,282

(22) Filed: Aug. 21, 2019

(65) Prior Publication Data

US 2020/0068575 A1 Feb. 27, 2020

Related U.S. Application Data

(60) Provisional application No. 62/720,794, filed on Aug. 21, 2018.

(51) Int. Cl.
*H04W 72/08* (2009.01)
*H04W 84/12* (2009.01)

(52) U.S. Cl.
CPC ............ *H04W 72/08* (2013.01); *H04W 84/12* (2013.01)

(58) Field of Classification Search
CPC .. H04W 72/08; H04W 84/12; H04W 72/1268
See application file for complete search history.

(56) References Cited

U.S. PATENT DOCUMENTS

2017/0303276 A1* 10/2017 Cheng ................... H04L 1/0015
2017/0332385 A1 11/2017 Shirali et al.

FOREIGN PATENT DOCUMENTS

EP  3 291 473  3/2018

OTHER PUBLICATIONS

Bankov Dmitry et al.: "OFDMA Uplink Scheduling in IEEE 802.11ax Networks", 2018 IEEE international Conference on Communications (ICC), IEEE, May 20, 2018, pp. 1-6, XP033378751 (Year: 2018).*
Bankov et al., "OFDMA Uplink Scheduling in IEEE 802.11ax Networks", 2018 IEEE International Conference on Communications, IEEE, May 20, 2018, pp. 1-6.
International Search Report and Written Opinion in PCT/US2019/047543 dated Nov. 11, 2019.

* cited by examiner

*Primary Examiner* — Siming Liu

(57) ABSTRACT

A method for allocating a plurality of resource units among a plurality of client stations in a wireless local area network is disclosed herein. An access point (AP) estimates a channel quality indicator for each of the respective channels between the AP and the plurality of client stations, obtains queue information corresponding to each of the plurality of client stations, and computes a utility function for each of the plurality of client stations based on the channel quality indicator and the obtained queue information. The AP then allocates each resource unit to a client station of the plurality of client stations having a highest value output by the respective utility function.

18 Claims, 4 Drawing Sheets

| STA j (RU 0) | STA j (RU 1) | STA k (RU 2) | ... |

*FIG. 2*

| STA j (RU 0) | STA k (RU 1) | ... |

*FIG. 3*

SYSTEMS AND METHODS FOR RATE SELECTION AND RESOURCE UNIT ALLOCATION WITHIN A WIRELESS LOCAL AREA NETWORK (WLAN)

CROSS-REFERENCE TO RELATED APPLICATION

This disclosure claims the benefit of U.S. Provisional Patent Application No. 62/720,794, filed Aug. 21, 2018, which is hereby incorporated by reference in its entirety.

FIELD OF USE

This disclosure relates to techniques and devices for resource unit allocation in a wireless data transmission system. For example, the system may include a wireless local area network (WLAN) implementing an IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

When operating in an infrastructure mode requiring a central access point (AP) connected to a number of client stations (STA), wireless local area networks (WLANs) typically operate in either a unicast mode or a multicast mode. In the unicast mode, the AP transmits information to one client station at a time. In the multicast mode, the same information is concurrently transmitted to a group of client stations. Development of WLAN standards such as the Institute for Electrical and Electronics Engineers (IEEE) 802.11a, 802.11b, 802.11g, 802.11n, and 802.11ax standards has improved data throughput by allowing transmissions across frequency bandwidth. In such implementations, a group of client stations can share the same bandwidth for data transmission. For example, the 802.11ax standards adopts orthogonal frequency division multiple access (OFDMA) to support multiple users in the same bandwidth, and each user is scheduled with a resource unit (RU) occupying a number of subcarriers in frequency.

A resource allocation mechanism is needed to allocate available RUs to each client for transmitting data frames to the AP. For example, both the AP and/or the client station need to know how much bandwidth out of a channel is allocated to a specific user. Specifically, when a large number of client stations share a transmission channel to transmit with a low-cost AP (e.g., home use), the existing resource allocation signaling mechanism may be inefficient in terms of bandwidth utilization. For example, the existing resource unit allocation systems fail to maximize efficiency on the system level—i.e., determining what time-frequency bandwidth is to be allocated to the selected users and what transmit powers is to be used.

SUMMARY

Embodiments described herein provide a method for allocating a plurality of resource units among a plurality of client stations in a wireless local area network. The method includes, for allocating each resource unit, estimating, at the access point (AP), a channel quality indicator for each of the respective channels between the AP and the plurality of client stations, obtaining, at the AP, queue information indicative of data to be transmitted to the AP from each of the plurality of client stations, computing, at the AP, a utility function indicative of the utility of transmitting data from the respective client stations as a function of the channel quality indicator and the obtained queue information, and allocating the resource unit to a client station of the plurality of client stations having a highest value output by the respective utility function.

In some implementations, the AP is configured to store a rate adaptation table. The rate adaptation table includes a set of uplink receiver sensitivity measurement values, an uplink transmission rate corresponding to each of the uplink receiver sensitivity measurement values, a number of spatial streams corresponding to each of the uplink receiver sensitivity measurement values, and a modulation and coding scheme corresponding to each of the uplink receiver sensitivity measurement values.

In some implementations, the AP estimates the channel quality indicator for each of the respective channels between the AP and plurality of client stations by selecting, at the AP, a single-user transmission rate across the entire bandwidth indicative of a bit rate for transmitting data to a single client station communicating with the AP as a base rate, identifying an uplink receiver sensitivity measurement corresponding to the single-user transmission rate from the rate adaptation table, calculating a delta value indicative of a difference between the single-user transmission rate and the actual rate of transmission based on a channel state measurement, a size of the bandwidth, a size of the resource unit to be allocated, calculating an updated uplink receiver sensitivity for each resource unit as a function of the obtained uplink receiver sensitivity measurement and the calculated delta value, and adjusting the base rate by mapping the updated uplink receiver sensitivity to the corresponding uplink transmission rate identified from the rate adaptation table.

In some implementation, the AP obtains queue information corresponding to each of the plurality of client stations by obtaining, at a wireless receiver of the AP, a data management packet from each of the client stations communicating with the AP, the data management packet comprising information about total needed transmission durations needed to empty respective queues corresponding to the respective client stations.

In some implementations, the AP temporarily allocates a resource unit to a client station corresponding to the highest utility value, updates the channel quality indicator and the queue information after allocation of each resource unit and before allocation of the next resource unit, determines whether an even-numbered resource unit of the plurality of resource units is allocated to a client station different from the client station assigned to the previous resource unit, and in response to determining that an even-numbered resource unit is allocated to a client station different from the client station assigned to the prior resource unit, removes the client station assigned to the prior resource unit from consideration when subsequently allocating additional resource units.

In some implementations, the AP determines whether an odd-numbered resource unit is allocated to a client station different from the client station assigned to the prior resource unit, and in response to determining that an odd-numbered resource unit is allocated to a client station different from the client station assigned to the prior resource unit, removes both the client station assigned to the odd-numbered resource unit and the client station assigned to the prior resource unit from consideration when allocating additional resource units.

In some implementations, when the AP allocates an even-numbered resource unit and an immediately two prior resource units to a same client station, the AP allocates the next resource unit to the same client station.

In some implementations, when the AP allocates an even-numbered resource unit and two prior resource units to a same client station, the AP changes the allocation of the even-numbered resource unit to be assigned to a different client station.

In some implementations, when the AP allocates a consecutive number of resource units starting from the first resource unit to the same client station, the AP determines whether the total number of resource units allocated to the client station occupy at least half of the entire bandwidth. In response to determining that the total number of resource units allocated to the client station occupy at least half of the entire bandwidth available to the AP, the AP allocates all available resource units to the client station.

In some implementations, when the AP allocates a consecutive number of resource units beginning at the first resource unit, the method further includes determining whether the total number of resource units allocated to the client station occupy at least half of the entire bandwidth. In response to determining that the total number of resource units allocated to the client station occupy less than half of the entire bandwidth, the AP removes the client station from consideration when subsequently allocating additional resource units.

Embodiments are also described herein for a wireless access point system for allocating a plurality of resource units among a plurality of client stations in a wireless local area network, the wireless access point system including, for allocating each resource unit, an access point (AP) configured to estimate a channel quality indicator for each of the respective channels between the AP and the plurality of client stations, obtain queue information indicative of data to be transmitted to the AP from each of the plurality of client stations, compute a utility function indicative of the utility of transmitting data from the respective client stations as a function of the channel quality indicator and the obtained queue information, and allocate the resource unit to a client station of the plurality of client stations having a highest value output by the respective utility function.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which:

FIG. 2 provides an example block diagram illustrating an example of resource allocation, according to some embodiments described herein;

FIG. 3 provides another example block diagram illustrating an example of resource allocation, according to some embodiments described herein;

DETAILED DESCRIPTION

This disclosure describes methods and systems for allocating resource units (RU) within an 802.11 (e.g., 802.11ax) wireless network. When allocating resource units, methods and systems disclosed herein account for unpredictability in the respective link capacity of different channels (i.e., channel awareness) and different types of traffic that may be transmitted to the respective stations (i.e., queue awareness). By using Quality of Service determination made for each of the client stations measured, for instance, as a function of one or more data rates, delay, loss, and fairness among the different client stations, system efficiency as measured by the total amount of traffic supported by the AP can be improved.

Figure 1:
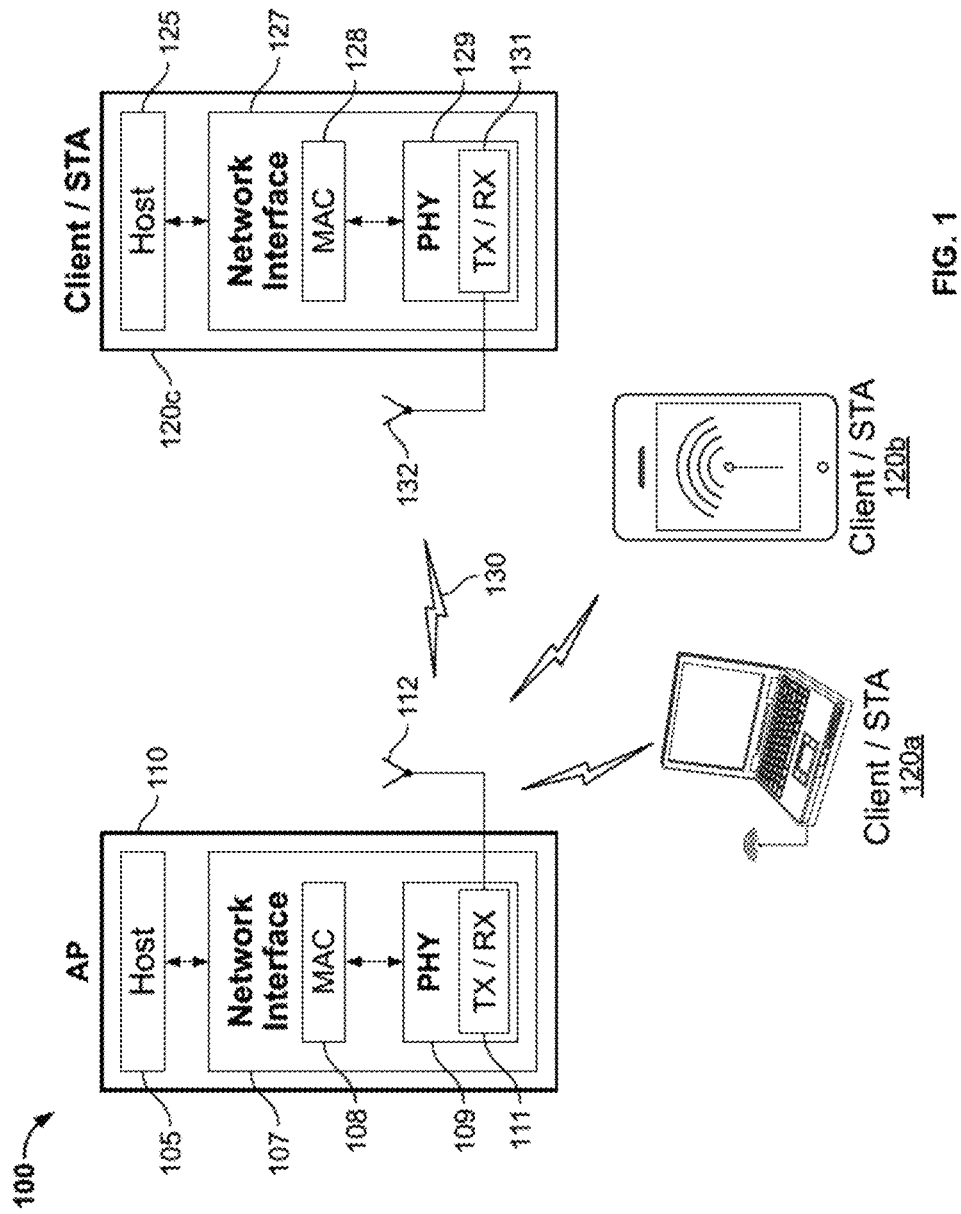
FIG. 1 is a block diagram of an example wireless WLAN 100 in which the resource units can be allocated, according to some embodiments described herein.

FIG. 1 is a block diagram of an example wireless WLAN 100 that the resource unit allocation mechanism can be operated within, according to some embodiments described herein. A wireless AP 110 (access point) includes a host processor 105 (host control circuitry) that may be configured to process or assist in data operation, such as modulation/demodulation, encoding/decoding, encryption/decryption, or the like. For example, the host processor 105 of an AP, in accordance with an implementation, is configured to allocate resource unit among a plurality of client stations, as illustrated in FIGS. 2-5.

A network interface circuitry 107 is coupled to the host processor 105, which is configured to interface with a plurality of client stations. The network interface circuitry 107 includes a medium access control (MAC) processing unit 108 and a physical layer (PHY) processing unit 109. The PHY processing unit 109 includes a plurality of transceivers 111, and the transceivers 111 are coupled to a plurality of antennas 112 (for simplicity only one is shown).

The WLAN 100 includes a plurality of client stations 120*a-c*. Although three client stations 120*a-c* are illustrated in FIG. 1, the WLAN 100 can include different numbers (e.g., 1, 2, 3, 5, 6, etc.) of client stations 120*a-c* in various scenarios and embodiments. Each client station, e.g., 120*a-c*, may have a similar structure as that of an AP 110 (access point). For example, the client station 120*c* seen in FIG. 1 includes a host processor 125 (host control circuitry) coupled to a network interface circuitry 127. The network interface circuitry 127 includes a MAC processing unit 128 and a PHY processing unit 129. The PHY processing unit 129 includes a plurality of transceivers 131, and the transceivers 131 are coupled to a plurality of antennas 132 (for simplicity only one is shown) to receive or transmit data from or to the wireless communication channel.

Two or more of the client stations 120*a-c* may be configured to receive data such as including an 802.11 data frame 130, which may be transmitted concurrently by the AP 110 (access point). Additionally, two or more of the client stations 120*a-c* can be configured to transmit data to the AP 110 (access point) such that the AP 110 receives the data.

Since, in implementations, the wireless AP 110 is not equipped to explicitly determine Channel Quality Indicator (CQI) for the channel between the AP 110 and respective client stations 120a-c, the wireless AP 110 uses the single-user (SU) rate adaptation choice and channel state information (CSI) to estimate CQI for the channel. Specifically, the AP 110 uses the adapted SU rate on the full bandwidth as the base chosen rate for each possible RU based on the CQI. In some embodiments, the rate used in multiple-user (MU) transmission is included in the SU rate adaptation statistics logging for further RU allocation decision. The wireless AP 110 considers the channel quality on each RU and adjusts the base rate to the final chosen rate.

Additionally, the AP 110 maintains queue awareness for each client station 120a-c. Specially, the AP 110 maintains up to 8 queues (for each traffic identifier (TID)) for each associated client station 120a-c. In some embodiments, the AP 110 maintains total needed transmission durations for emptying each queue, first m queues, or all queues. The total need transmission durations are dynamically updated. In some implementations, the AP 110 maintains a sorted list for such transmission times. For example, the AP 110 finds the first k longest transmission times to determine the Physical Layer Convergence Protocol (PLCP) Service Data Unit (PSDU) duration. Additionally, the AP 110, in some embodiments, maintains a queueing delay for the head of line packet.

When allocating RUs among the client stations 120a-c with which it communicates, the AP 110 computes a utility function for a client station i using the following equation (1):

$$U_i(t) \stackrel{def}{=} \frac{q_i D_i(t)}{T_i(t)} r_i(t), \qquad (1)$$

where $q_i$ is configurable constant depending on the TID or Access Category information obtained from each of the client stations 120a-c; $D_i(t)$ is a delay function (i.e., how long a particular packet has been waiting in the respective queue) for each Traffic ID; and $T_i(t)$ is the average throughput of the client station i achieved till time t. In some implementations, the average throughput of the client station i at time t+1 is determined by the following equation (2):

$$T_i(t+1) = \alpha_i T_i(t) + (1-\alpha_i) r_i(t), \qquad (2)$$

Where $\alpha_i$ is a moving average which gives more weight to the currently allocated client station. The rate adaption algorithm for $r_i(t)$ is a function of the previous rate, CSI, and possible corresponding RU quality. Accordingly, the AP 110 incorporates both channel awareness and queue awareness when calculating the utility function for RU allocation.

To achieve the above, the AP 110 needs to get the estimation of CQI to have a better RU allocation. Known methods for estimating CQI include i) obtaining the received signal strength information (RSSI) across the whole band that the possible RU to be allocated sits in; ii) obtaining CSI per tone-block for a sampled channel; or iii) relying on the current SU rate through a SU rate adaptation algorithm. However, methods and systems disclosed herein improve upon the CQI estimation.

Specifically, the AP adjusts the rate adaptation output. The AP 110 maps the current SU rate to the uplink receiver sensitivity according to a rate adaption table. An example of the rate adaptation table is shown below in Table (1), where the AP has a maximum of 4 transmitters and the client station supports a maximum of 3 spatial streams:

TABLE (1)

| Rate (Mbps) | Nss | MCS | Uplink Rx Sensitivity(dB) | Rx Sensitivity difference between neighboring rates(dB) |
|---|---|---|---|---|
| 365.63 | 3 | 11 | −54 | 5 |
| 329.06 | 3 | 10 | −59 | 5 |
| 292.50 | 3 | 9 | −64 | 3 |
| 263.25 | 3 | 8 | −67 | 3 |
| 219.38 | 3 | 7 | −70 | 3 |
| 197.44 | 3 | 6 | −72 | 2 |
| 175.50 | 3 | 5 | −74 | 2 |
| . . . | | | | . . . |

The AP 110 computes a delta value for each tone block using the following equation (3).

$$\text{Delta\_i} = 10 \log 10 Tr(H_i H_i^*) - 10 \log 10(N\text{Tones}(RU(i))) - (10 \log 10 Tr(HH^*) - 10 \log 10(N\text{Tones(entire bandwidth)})), \qquad (3)$$

where the delta value is a function of the CSI of each RU, the bandwidth size, and the size of the RU (i.e., the number of tones for each RU). Specifically, the delta value represents a difference between the chosen base rate and the actual observed rate.

The AP 110 then maps the estimated signal to noise ratio (SNR) (where SNR=Delta+the uplink RX sensitivity) to a new rate for this tone block according to the rate adaptation table. For example, in a system where the SU adaptation rate is determined to be 263.25 mbps, the AP 110 maps the current SU rate to the corresponding uplink RX sensitivity based on the value in the rate adaptation table (1) shown above. In the example system where the rate is determined to be approximately 263.25 mbps, the AP 110 determines the uplink RX sensitivity to be −67 dB by mapping the rate to the corresponding uplink RX sensitivity value in the rate adaptation table (1) shown above. Next, the delta value is calculated for each tone block using equation (3) above.

Once the delta value is calculated, the AP 110 maps the new estimated SNR (delta+uplink RX sensitivity) to a new rate. For example, in an instance where the delta value is computed to be −3 db, the AP 110 determines the new rate to correspond to the uplink RX sensitivity (i.e., (−64)+(−3) =−67 db) and be set to 292.50 mbps.

In some implementations, the SNR margin is based on observed packet error rate (PER). For example, the predefined rate adaptation table may not be accurate. In such cases, it is better to have a configurable parameter to adjust the estimated SNR input to the rate adaptation table such that a more accurate rate can be selected. For example, the SNR margin can be determined to be a function of the PER (i.e., SNR Margin=f(PER)). The rate is thus calculated using the following equation: Rate=RateDropTable (Estimated SNR− SNR Margin).

As discussed above, the AP 110 also incorporates queue awareness when allocating RUs between client stations. Specifically, as indicated in equation (1), the utility function computed by the AP 110 incorporates a delay function $D_i(t)$. The AP 110 assumes a head of line delay $D_{HOL}$, and a delay threshold of $d_i$ for a client station i (for each TID). The AP 110 then applies one of two following policies: (i) earliest deadline first based on equation (4) below; or (ii) largest weighted deadline first based on equation (5) below.

$$Di(t) = \frac{1}{di - DHOL, i} \quad (4)$$

$$Di(t) = -\log\frac{Pri}{di} \cdot DHOL, i, \quad (5)$$

where $Pr_i$ represents the acceptable probability for the client station i that the packet will be dropped due to deadline expiration. In some implementations, when two flows have the exact same head of line delay, an $\alpha_i$ weighs the metric so that the user with strongest requirements in terms of acceptable loss rate and deadline expiration will be preferred for allocation.

During implementation, the RU scheduler at AP 110 begins by deciding the granularity of the unit RU size (i.e., the whole bandwidth is divided by equal sized RU blocks (e.g., can be 26 tone blocks, 52 tone blocks, 104 tone blocks, etc.) and the next DL bandwidth has a total of k blocks. The unit RU size is determined based on the number of active associated client stations that have buffered traffic whose size meet a threshold B. For each RU block and predetermined PSDU duration T, the AP 110 selects a station $$i^* = \arg\max_{i:Q_i(t) > r_i(t)T} U_i(t),$$

where $Q_i(t)$ is the queue size under consideration. The tone block k is allocated to client station i* and the average rate and queue size of client station i* is updated. That is, the AP 110 recalculates the utility function for all of the client stations once the first tone block is allocated. The predetermined PSDU duration T is related to a buffer size overview and modulation and coding schemes (MCS) to be selected.

In some implementations, if multiple consecutive tone blocks are assigned to one client station, the AP 110 adjusts the RU size to match the sum of assigned tone blocks (e.g., if 2 consecutive 26-tone blocks are assigned to the same client station, the RU size is adjusted to be a single 52-tone block).

Additionally, there are a number of RU allocation restrictions in various embodiments to increase overall system efficiency. In some embodiments, assuming the allocation begins from the left-most RUs, the AP 110 performs current continuous allocation (i,j). In some implementations, a valid final allocation (i,j) requires i to be the even number and j to be the odd number.

FIGS. 2-5 show example resource allocation scenarios to further illustrate the various restrictions on resource allocation. For example, FIG. 2 illustrates a scenario where a client station j is allocated RU 0 and RU 1 (i.e., the utility function returned the highest value for station j) while station k is temporarily allocated RU 2. In an implementation illustrated in FIG. 2, where station k is a newly picked client station (i.e., different from the previous client station j) and the temporarily allocated RU is an even number, the AP 110 will never consider client station j for RU allocation.

FIG. 3 illustrates another example of a restriction on resource allocation. As illustrated in FIG. 3, when client station k is a newly selected client station (i.e., different from the previous client station j) and begins from an odd RU (e.g., RU 1 as shown in FIG. 3), the AP 110 will never consider client stations j and k for RU allocation.

Figure 4:
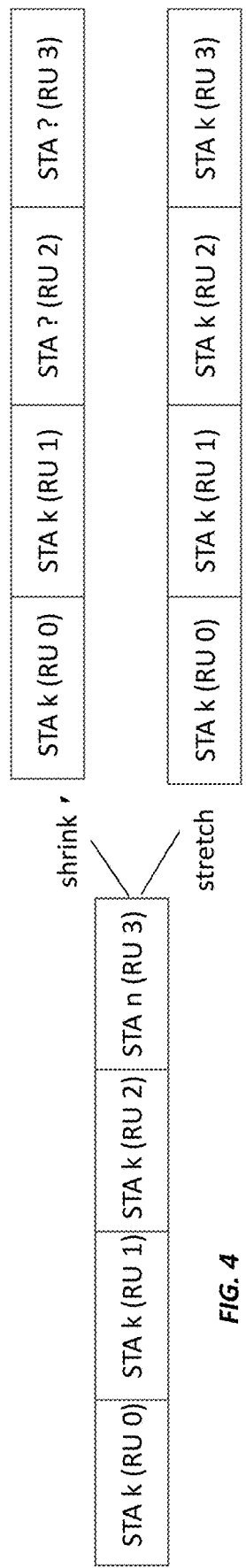
FIG. 4 provides another example block diagram illustrating an example of resource allocation, according to some embodiments described herein.

FIG. 4 illustrates yet another example of a restriction on resource allocation. As illustrated in FIG. 4, when client station k is picked in the previous assignment (i.e., the same client station is picked), the temporary tone block range is (i,j), where j is an even number. Thus, j+1 is an even number and it is temporarily assigned to a new client station. In response, in an implementation, the AP 110 stretches the tone block range (i,j) to (i,j+1). In an alternative implementation, the AP 100 shrinks the tone block range (i,j) to (i,j−1). In both implementations, the AP 110 removes the client station k from consideration in allocating the remaining available tone blocks. In some implementations, the AP 110 makes a decision between stretching or shrinking the tone block range based on comparing the value of the utility function to a threshold. For example, the AP 110 relies on the following equation (5): UtilityFunctionV(2x)/UtilityFunctionV(x)>I_threshold, where UtilityFunctionV(x) returns the value of the utility function.

Figure 5:
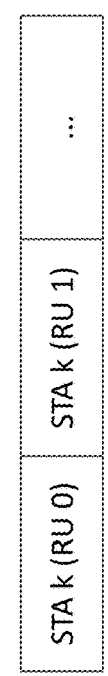
FIG. 5 provides another example block diagram illustrating an example of resource allocation, according to some embodiments described herein.

FIG. 5 provides yet another example of a resource allocation restriction. Specifically, when client station k is picked in the previous assignment (i.e., same client station is picked), where the temporary tone block range is set to (i,j), the AP 110 determines whether the client station k's temporary RU assignment (0,j) is half of the bandwidth to make a determination about whether to stretch the bandwidth to 20 MHz or 40 MHz. If the bandwidth is stretched (i.e., client station k's temporary RU assignment (0,j) is half of the bandwidth), the client station k is still considered for allocation of remaining tone blocks. If, on the other hand, the bandwidth is not stretched (i.e., client station k's temporary RU assignment (0,j) is less than half of the bandwidth), client station k is removed from further consideration when allocating the remaining tone blocks. Moreover, the AP 110 decides whether the middle 26-tone block range will be allocated. As discussed above, once RU allocation is finished, continuous multiple tone-block are mapped to a single RU (i.e., 2 continuous 26 tone-blocks allocated to the same client station is mapped to a single 52 tone-block RU).

Figure 6:
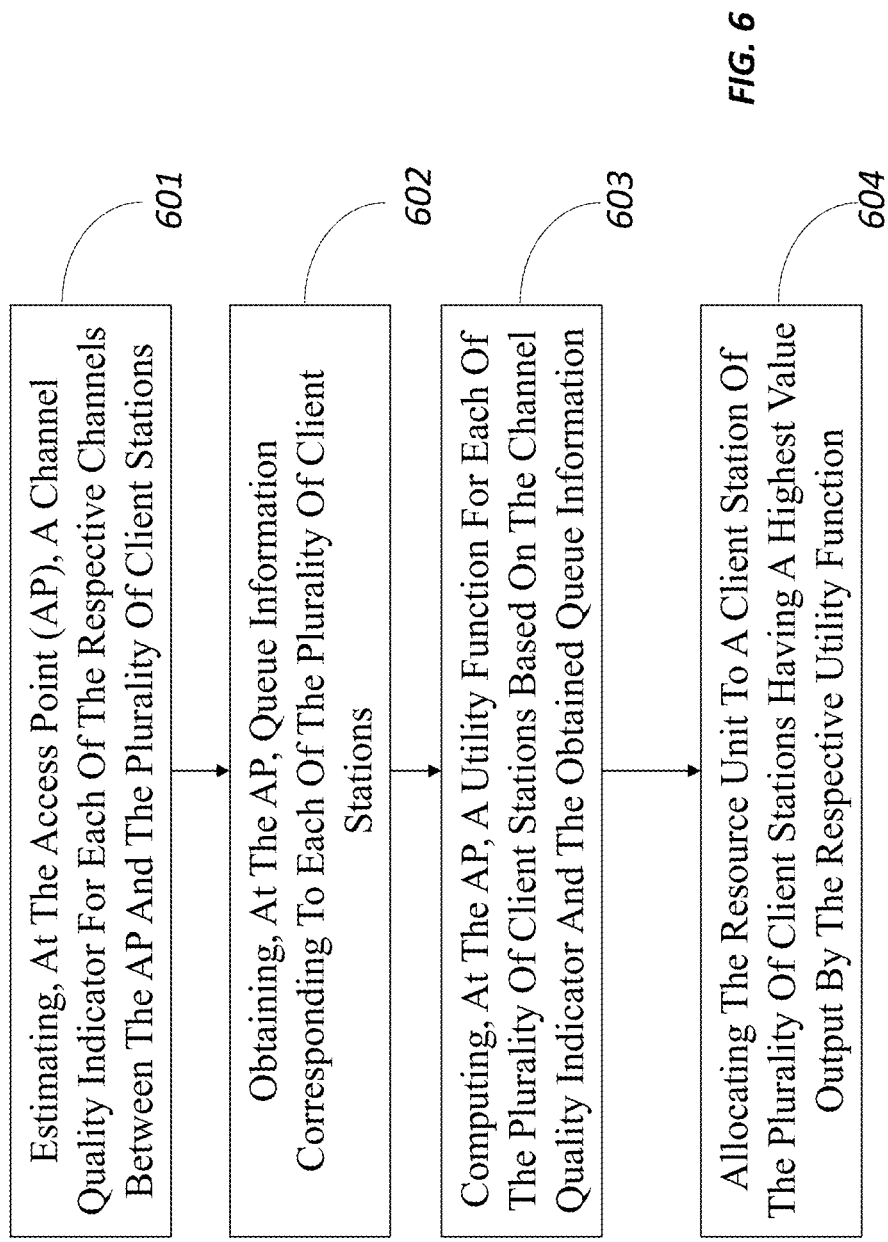
FIG. 6 provides an example flow diagram illustrating an example method for allocating resource units among a plurality of station units, according to some embodiments described herein.

FIG. 6 provides an flow diagram illustrating aspects of allocating resource units, according to an example embodiment described herein. At 601, the AP estimates a channel quality indicator for each of the respective channels between the AP and the plurality of client stations. Specifically, the AP estimates the CQI for each of the channels between the AP and each of the plurality of client stations based on a single-user rate and an uplink receiver sensitivity measurement.

At 602, the AP obtains queue information corresponding to each of the plurality of client stations. For example, the AP receives a data management packet containing information about the queues at each of the client stations.

At 603, the AP computes a utility function for each of the plurality of client stations based on the channel quality indicator and the obtained queue information. Specifically, the AP computes the utility function based on Equation (1) described above in more detail.

At 604, the AP allocates the resource unit to a client station of the plurality of client stations having a highest value output by the respective utility function. Once a particular resource unit is allocated, the AP updates the queue information and the channel quality indicator when allocating a next resource unit.

While this specification contains many specifics, these should not be construed as limitations on the scope of what may be claimed, but, rather, as descriptions of particular implementations of the subject matter.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for allocating a plurality of resource units among a plurality of client stations in a wireless local area network, the method comprising:
   for allocating each resource unit:
      estimating, at an access point (AP), a channel quality indicator for each of the respective channels between the AP and the plurality of client stations, the AP being configured to store a rate adaptation table, the rate adaptation table including:
         a set of uplink receiver sensitivity measurement values;
         an uplink transmission rate corresponding to each of the uplink receiver sensitivity measurement values;
         a number of spatial streams corresponding to each of the uplink receiver sensitivity measurement values; and
         a modulation and coding scheme corresponding to each of the uplink receiver sensitivity measurement values;
      obtaining, at the AP, queue information indicative of data to be transmitted to the AP from each of the plurality of client stations;
      computing, at the AP, a utility function indicative of the utility of transmitting data from the respective client stations as a function of the channel quality indicator and the obtained queue information; and
      allocating the resource unit to a client station of the plurality of client stations having a highest value output by the respective utility function.

2. The method of claim 1, wherein estimating the channel quality indicator for each of the respective channels between the AP and plurality of client stations comprises:
   selecting, at the AP, a single-user transmission rate across the entire bandwidth indicative of a bit rate for transmitting data to a single client station communicating with the AP as a base rate;
   identifying an uplink receiver sensitivity measurement corresponding to the single-user transmission rate from the rate adaptation table;
   calculating a delta value indicative of a difference between the single-user transmission rate and an actual rate of transmission based on a channel state measurement, a size of the bandwidth, a size of the resource unit to be allocated, and
   calculating an updated uplink receiver sensitivity for each resource unit as a function of the obtained uplink receiver sensitivity measurement and the calculated delta value; and
   adjusting the base rate by mapping the updated uplink receiver sensitivity to the corresponding uplink transmission rate identified from the rate adaptation table.

3. The method of claim 1, wherein obtaining, at the AP, queue information corresponding to each of the plurality of client stations comprises:
   obtaining, at a wireless receiver of the AP, a data management packet from each of the client stations communicating with the AP, the data management packet comprising information about total needed transmission durations needed to empty respective queues corresponding to the respective client stations.

4. The method of claim 1, further comprising:
   temporarily allocating, by the AP, a resource unit to a client station corresponding to the highest utility value;
   updating the channel quality indicator and the queue information after allocation of each resource unit and before allocation of the next resource unit;
   determining whether an even-numbered resource unit of the plurality of resource units is allocated to a client station different from the client station assigned to the previous resource unit; and
   in response to determining that an even-numbered resource unit is allocated to a client station different from the client station assigned to the prior resource unit, removing the client station assigned to the prior resource unit from consideration when subsequently allocating additional resource units.

5. The method of claim 1, further comprising:
   temporarily allocating, by the AP, a resource unit to a client station corresponding to the highest utility value;
   updating the channel quality indicator and the queue information after allocation of each resource unit and before allocation of a next resource unit;
   determining whether an odd-numbered resource unit is allocated to a client station different from the client station assigned to the prior resource unit,
   in response to determining that an odd-numbered resource unit is allocated to a client station different from the client station assigned to the prior resource unit, removing both the client station assigned to the odd-numbered resource unit and the client station assigned to the prior resource unit from consideration when allocating additional resource units.

6. The method of claim 1, further comprising:
   temporarily allocating, by the AP, a resource unit to a client station corresponding to the highest utility value;
   updating the channel quality indicator and the queue information after allocation of each resource unit and before allocation of a next resource unit;
   determining whether an even-numbered resource unit and an immediately two prior resource units are allocated to the same client station;
   in response to determining that the even-numbered resource unit and an immediately two prior resource units to the same client station, allocating the next resource unit to the same client station.

7. The method of claim 1, further comprising:
   temporarily allocating, by the AP, a resource unit to a client station corresponding to the highest utility value;
   updating the channel quality indicator and the queue information after allocation of each resource unit and before allocation of a next resource unit;

determining whether an even-numbered resource unit and an immediately two prior resource units are allocated to the same client station;

in response to determining that the even-numbered resource unit and an immediately two prior resource units are allocated to the same client station, changing the allocation of the even-numbered resource unit to be assigned to different client station.

8. The method of claim 1, further comprising:
temporarily allocating, by the AP, a resource unit to a client station corresponding to the highest utility value;
updating the channel quality indicator and the queue information after allocation of each resource unit and before allocation of a next resource unit;
determining, when a consecutive number of resource units starting from the first resource unit is allocated to a client station, whether the total number of resource units allocated to the client station is at least half of the entire bandwidth used by the AP; and
in response to determining that the total number of resource units allocated to the client station occupies at least half of the entire bandwidth:
allocating all available resource units in the bandwidth to the client station.

9. The method of claim 1, further comprising:
temporarily allocating, by the AP, a resource unit to a client station corresponding to the highest utility value;
updating the channel quality indicator and the queue information after allocation of each resource unit and before allocation of a next resource unit;
determining, when a consecutive number of resource units starting from the first resource unit is allocated to a client station, whether the total number of resource units allocated to the client station is at least half of the entire bandwidth used by the AP; and
in response to determining that the total number of resource units allocated to the client station occupies less than half of the entire bandwidth:
removing the client station allocated to the odd-numbered resource unit from consideration when subsequently allocating additional resource units.

10. A wireless access point system for allocating a plurality of resource units among a plurality of client stations in a wireless local area network, the system comprising:
for allocating each resource unit:
an access point (AP) configured to:
estimate a channel quality indicator for each of the respective channels between the AP and the plurality of client stations;
obtain queue information indicative of data to be transmitted to the AP from each of the plurality of client stations;
compute a utility function indicative of the utility of transmitting data from the respective client stations as a function of the channel quality indicator and the obtained queue information;
allocate the resource unit to a client station of the plurality of client stations having a highest value output by the respective utility function; and
store a rate adaptation table, the rate adaptation table including:
a set of uplink receiver sensitivity measurement values;
an uplink transmission rate corresponding to each of the uplink receiver sensitivity measurement values;
a number of spatial streams corresponding to each of the uplink receiver sensitivity measurement values; and
a modulation and coding scheme corresponding to each of the uplink receiver sensitivity measurement values.

11. The wireless access point system of claim 10, wherein the AP, when estimating the channel quality indicator for each of the respective channels between the AP and plurality of client stations, is further configured to:
select, at the AP, a single-user transmission rate across the entire bandwidth indicative of a bit rate for transmitting data to a single client station communicating with the AP as a base rate;
identify an uplink receiver sensitivity measurement corresponding to the single-user transmission rate from the rate adaptation table;
calculate a delta value indicative of a difference between the single-user transmission rate and an actual rate of transmission based on a channel state measurement, a size of the bandwidth, a size of the resource unit to be allocated;
calculate an updated uplink receiver sensitivity for each resource unit as a function of the obtained uplink receiver sensitivity measurement and the calculated delta value; and
adjust the base rate by mapping the updated uplink receiver sensitivity to the corresponding uplink transmission rate identified from the rate adaptation table.

12. The wireless access point system of claim 10, wherein the AP, when obtaining, at the AP, queue information corresponding to each of the plurality of client stations, is further configured to:
obtain, at a wireless receiver of the AP, a data management packet from each of the client stations communicating with the AP, the data management packet comprising information about total needed transmission durations needed to empty respective queues corresponding to the respective client stations.

13. The wireless access point system of claim 10, wherein the AP is further configured to:
temporarily allocate a resource unit to a client station corresponding to the highest utility value;
update the channel quality indicator and the queue information after allocation of each resource unit and before allocation of the next resource unit;
determine whether an even-numbered resource unit of the plurality of resource units is allocated to a client station different from the client station assigned to the previous resource unit; and
in response to determining that an even-numbered resource unit is allocated to a client station different from the client station assigned to the prior resource unit, remove the client station assigned to the prior resource unit from consideration when subsequently allocating additional resource units.

14. The wireless access point system of claim 10, wherein the AP is further configured to:
temporarily allocate a resource unit to a client station corresponding to the highest utility value;
update the channel quality indicator and the queue information after allocation of each resource unit and before allocation of a next resource unit;
determine whether an odd-numbered resource unit is allocated to a client station different from the client station assigned to the prior resource unit, in response to determining that an odd-numbered resource unit is allocated to a client station different from the client station assigned to the prior resource unit, remove both the client station assigned to the odd-numbered resource unit and the client station assigned to the prior resource unit from consideration when allocating additional resource units.

15. The wireless access point system of claim 10, wherein the AP is further configured to:
   temporarily allocate a resource unit to a client station corresponding to the highest utility value;
   update the channel quality indicator and the queue information after allocation of each resource unit and before allocation of a next resource unit;
   determine whether an even-numbered resource unit and an immediately two prior resource units are allocated to the same client station;
   in response to determining that the even-numbered resource unit and an immediately two prior resource units to the same client station, allocate the next resource unit to the same client station.

16. The wireless access point system of claim 10, wherein the AP is further configured to:
   temporarily allocate a resource unit to a client station corresponding to the highest utility value;
   update the channel quality indicator and the queue information after allocation of each resource unit and before allocation of a next resource unit;
   determine whether an even-numbered resource unit and an immediately two prior resource units are allocated to the same client station;
   in response to determining that the even-numbered resource unit and an immediately two prior resource units are allocated to the same client station, change the allocation of the even-numbered resource unit to be assigned to different client station.

17. The wireless access point system of claim 10, wherein the AP is further configured to:
   determine, when a consecutive number of resource units starting from the first resource unit is allocated to a client station, whether the total number of resource units allocated to the client station is at least half of the entire bandwidth used by the AP; and
   in response to determining that the total number of resource units allocated to the client station occupies at least half of the entire bandwidth, allocate all available resource units in the bandwidth to the client station.

18. The wireless access point system of claim 10, wherein the AP is further configured to:
   determine, when a consecutive number of resource units starting from the first resource unit is allocated to a client station, whether the total number of resource units allocated to the client station is at least half of the entire bandwidth used by the AP; and
   in response to determining that the total number of resource units allocated to the client station occupies less than half of the entire bandwidth, remove the client station allocated to the odd-numbered resource unit from consideration when subsequently allocating additional resource units.

* * * * *